United States Patent [19]

Barthel et al.

[11] 4,206,902
[45] Jun. 10, 1980

[54] INNER ELEMENT FOR A FLOW REGULATOR

[75] Inventors: Horst Barthel, Hamburg, Fed. Rep. of Germany; Robert R. Bell, Houston, Tex.

[73] Assignee: Vapor Corporation, Chicago, Ill.

[21] Appl. No.: 805,630

[22] Filed: Jun. 13, 1977

[51] Int. Cl.$^2$ .......................................... F16K 31/122
[52] U.S. Cl. ........................................ 251/57; 138/45; 138/89; 251/63.5; 251/191; 251/358; 428/377; 428/493
[58] Field of Search ....................... 251/5, 57, 62, 63.5, 251/357, 358, 191; 428/377, 493; 138/45, 46, 89

[56] References Cited

U.S. PATENT DOCUMENTS

| | | | |
|---|---|---|---|
| 326,613 | 9/1885 | Whittaker | 251/358 |
| 2,438,965 | 4/1948 | Dasher | 428/493 X |
| 2,701,221 | 2/1955 | Clayton, Jr. et al. | 428/493 |
| 2,917,269 | 12/1959 | Welker | 251/63.5 |
| 2,947,325 | 8/1960 | McFarland, Jr. | 251/358 |
| 3,047,008 | 7/1962 | Clarkson | 251/5 |
| 3,282,296 | 11/1966 | Glasgow | 251/358 |
| 3,368,787 | 2/1968 | Sachnik et al. | 251/63.5 |
| 3,380,470 | 4/1968 | Culpepper, Jr. et al. | 251/63.5 |
| 3,502,299 | 3/1970 | Phillips | 251/306 |
| 3,654,061 | 4/1972 | Berwanger | 428/377 |
| 3,746,300 | 7/1973 | Welker | 251/63.5 |
| 4,025,050 | 5/1977 | Manki et al. | 251/306 |

OTHER PUBLICATIONS

A. T. McPherson et al.—Engineering Uses of Rubber—pp. 63–76.
A. R. Payne et al.—Engineering Design with Rubber—pp. 1–17 and 135–149.

Primary Examiner—Martin P. Schwadron
Assistant Examiner—G. L. Walton
Attorney, Agent, or Firm—Francis J. Lidd

[57] ABSTRACT

A valve for a flow regulator employed in a fluid system is disclosed. The flow regulator includes a housing defining an internal chamber and a fluid inlet and outlet communicating with the chamber each adapted to be connected to the fluid system. Mounted within the chamber is a reciprocating piston that is actuated by an external master piston. A backing element is also mounted within the housing. The valve includes an elastomeric inner member including a body with a circumferential layer of elastomeric material bonded to the body. The inner member is mounted between the piston and stationary backing member and upon being compressed by the piston, varies the flow area through the inner chamber. To protect the interface of the outer layer and the body from fluid flow, a shield may be placed along the backing member and the upstream end of the inner member.

20 Claims, 3 Drawing Figures

INNER ELEMENT FOR A FLOW REGULATOR

BACKGROUND OF THE INVENTION

A. Field of the Invention

The device of the present invention relates to a new and improved inner member for controlling the flow of fluid through a flow regulator.

B. Description of the Prior Art

In industries such as the natural gas industry where flow of fluid under varying pressures is desired to be controlled, fluid flow regulators of the type that compress a solid elastomeric inner element or member in order to enlarge the outer periphery of the element thereby reducing the flow area through the regulator have been employed. These prior art regulators include a housing mounted within the fluid system. Within the housing a reciprocating cylinder is positioned, and controlled by an external master piston. Within the regulator is a stationary member that is adjacent the piston. The elastomeric inner element is positioned between the piston and the stationary member.

To reduce the flow through the regulator and thus the fluid system, the cylinder is actuated by the master piston compressing the inner member and radially bulging the elastomeric element to reduce the cross-sectional flow area through the regulator. Fluid flow through the system is controlled in this manner. Examples of such regulators and elements are disclosed in U.S. Pat. No. 2,917,269—Welker, U.S. Pat. No. 3,368,787—Sachnik et al, and U.S. Pat. No. 3,380,470—Culpepper, Jr. et al.

These prior art valves are particularly desirable since they are very effective in providing a wide range of flow control at low noise levels. In the larger sizes of inner elements and flow regulators employed in large gas lines containing fluid under substantial pressure, particularly where applications require regulation to a relatively low downstream pressure, deterioration of the outer surface of the prior art solid inner element occurs resulting in reduced life. While replacement of the inner element is easily accomplished, the shut down time of the piping system necessary to accomplish this is undesirable.

SUMMARY OF THE INVENTION

An object of the present invention is to provide a new and improved inner element to be employed in a fluid regulator for controlling fluid flow.

Another object of the present invention is to provide a new and improved method for fabricating an inner element employed in a fluid regulator.

A further object of the present invention is to provide a control valve having increased life when used for resolution of large gas flow in high pressure environments and to a method for fabricating an inner element for such a valve.

Briefly, the present invention is directed to a new and improved valve inner member or element for controlling fluid flow through a flow regulator. The regulator includes a housing defining an internal chamber and includes a fluid inlet and outlet communicating with the inner chamber each adapted to be connected to a fluid system such as a gas line. Mounted within the internal chamber is a stationary backing member and a reciprocal cylinder adjacent the backing member. The reciprocating cylinder is actuated by an external master piston controlled by a pneumatic source. The master piston varies hydraulic pressure to the cylinder reciprocating the piston in response to a command from the external control.

Mounted between the stationary member and the reciprocal cylinder is a valve inner element fabricated from elastomeric material. As the valve is compressed by actuation of the reciprocating cylinder, the inner element expands in a radial direction, reducing the annular flow area through the regulator and thus controlling the fluid flow in the system.

In accordance with an important feature of the present invention, the member or element includes a body of elastomeric material. The outer, circumferential layer of the body incorporates at least one secondary layer of elastomeric material having improved characteristics including greater resistance to abrasion and gas permeation, relative to the material of the body, and is bonded and vulcanized to the body. The valve element and particularly the secondary layer is better able to withstand the deleterious effects of the high pressure fluid flow through the regulator.

In addition, a shield may be positioned between the backing member and the inner element to protect the interface of the secondary layer and the body from the deleterious effects of the high pressure fluid.

BRIEF DESCRIPTION OF THE DRAWINGS

The above and other objects and advantages and novel features of the present invention will become apparent from the following detailed description of a preferred embodiment of the invention illustrated in the accompanying drawing wherein.

DESCRIPTION OF THE PREFERRED EMBODIMENT

Figure 1:
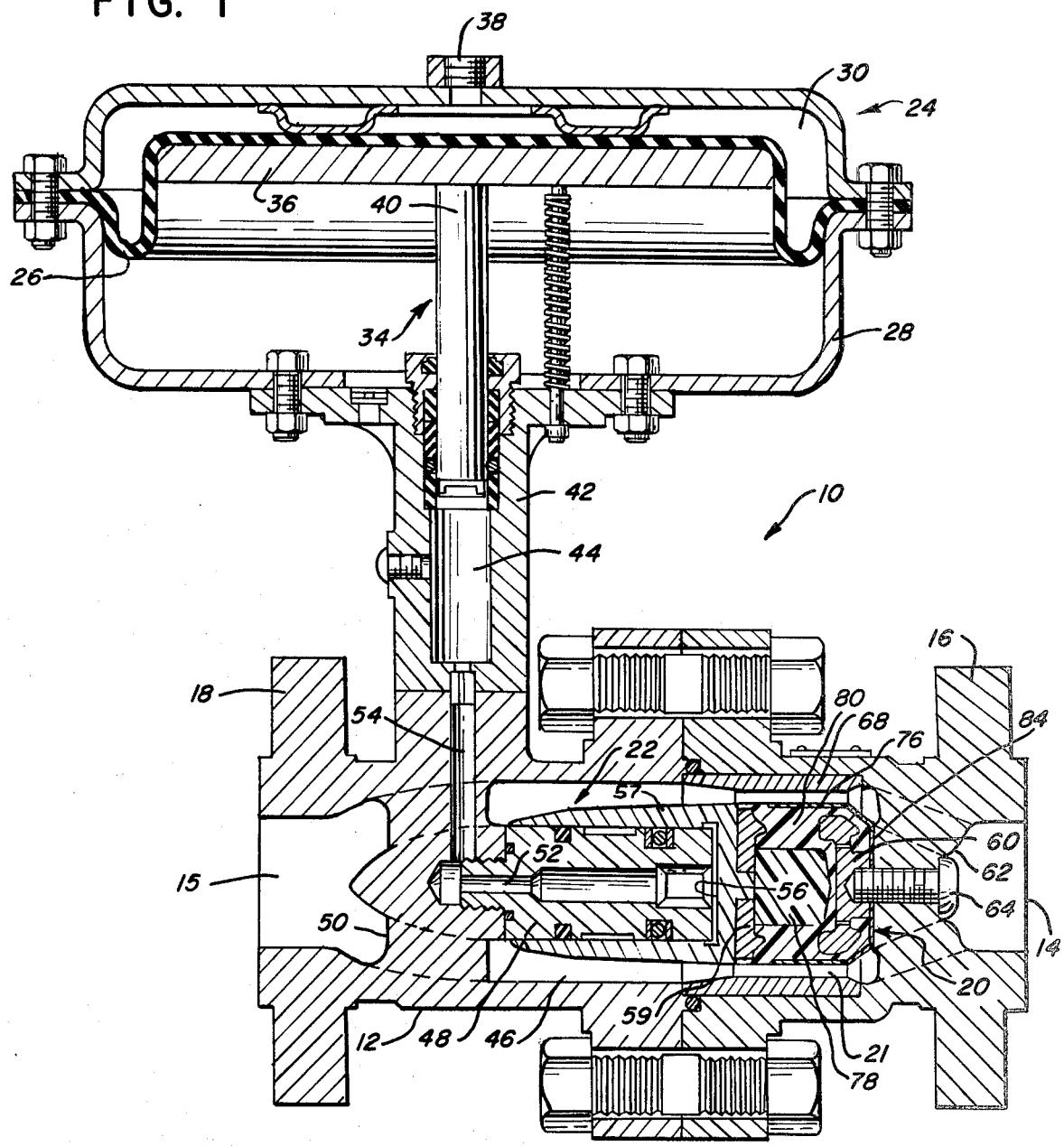
FIG. 1 is a sectional view of a regulator including a valve inner element constructed in accordance with the principles of the present invention.
Figure 2:
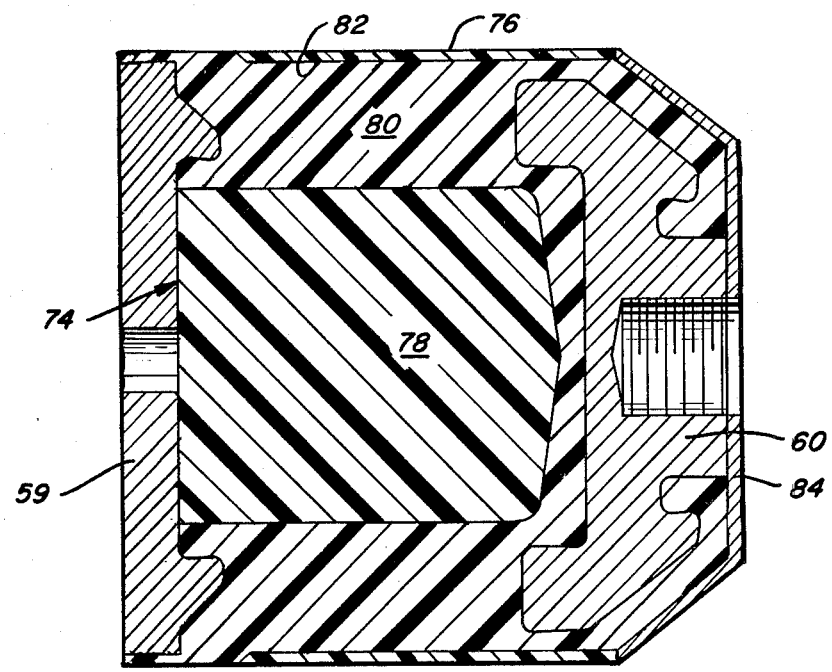
FIG. 2 is an enlarged view of the inner element.

With reference to FIG. 1, there is disclosed a fluid flow regulator 10. The fluid flow regulator 10 includes a body 12 having an inlet 14 and an outlet 15 adapted to be connected to a fluid system by flanges 16 and 18, respectively. A detailed description of the regulator 10 is provided in U.S. Pat. No. 3,380,470—Culpepper, Jr. et al.

Fluid flow through the system is controlled by compression of an elastomeric valve inner member or element generally designated as 20. The elastomeric member 20 is positioned within an inner chamber 22 defined within the body 12 and bulges under compression in a radial direction to reduce the flow area 21 in the inner chamber 22 thereby controlling the flow rate through the regulator 10.

Compression of the valve inner element 20 is controlled by a pneumatic actuator 24. The actuator 24 utilizes a diaphragm assembly including a diaphragm 26 separating a housing 28 of the actuator 24 into a pneumatic or air chamber 30 and an oil chamber 44.

The diaphragm 26 controls the position of a piston 34 within the housing 28. More specifically, the diaphragm 26 is secured to a piston head or platform 36, and upon introduction of pressurized air into chamber 30 through a control port 38, the diaphragm 26 moves the platform 36 downward moving a piston rod 40 into the casing 42.

The casing 42 includes a pumping chamber 44 that contains a fluid such as oil.

This operation of the pneumatic oil actuator 24 controls the actuation or compression of the valve 20 by controlling the actuation of a cylinder generally designated as 46 reciprocally mounted within the body 12 in the chamber 22. More specifically, the cylinder 46 includes a stationary piston 48 secured to a web 50 which is affixed within the chamber 22. Within the stationary piston 48 there is a central bore 52 that is in fluid communication with the pumping chamber 44 by way of a passage 54. The bore 52 communicates with a cylinder chamber 56 defined between the head of stationary piston 48 of cylinder 46 and the reciprocal cylinder 46.

Accordingly, upon introduction of control pressure through port 38 into the actuator 24; piston 34, under the influence of the diaphragm 26, is depressed a proportional amount resulting in increased hydraulic pressure in bore 52 as communicated from the pumping chamber 44. This compressed fluid is introduced into chamber 56 causing the reciprocal cylinder 46 to move away from the stationay piston 48.

This reciprocation or movement of cylinder 46 and a backing member 59 secured to cylinder 46 compresses the valve inner element 20 against a stationary backing member 60 that is secured to a web portion 62 by a fastener 64. The valve inner element 20, which is fabricated of elastomeric material, bulges in a radial direction upon compression thus reducing the flow area 21 between the outer peripheral surface of the valve element 20 and a liner 68 that is secured to the inner peripheral surface of the chamber 22.

In accordance with an important feature of the present invention, the valve inner element 20 includes a body generally designated by the numeral 74 and an outer layer 76. In typical prior art flow regulators of the type using an elastomer, disc shaped valve; high pressure fluid flow through the body 12 of the regulator 10 results in deterioration of the outer surface of the valve inner element. To overcome this disadvantage, the improved valve inner element 20 is employed. The inner portion 74 of the valve member 20 is fabricated from an elastomeric material such as nitrile rubber of a predetermined hardness.

The body 74 includes an elongated plug 78 of essentially a disc-like configuration. The plug 78 may be solid as illustrated in the drawings or may be hollow as disclosed in U.S. Pat. No. 2,917,269 described above. The body 74 also includes a second portion 80 bonded to the outer periphery of the plug 78. Prior to bonding the portion 80 to the plug 78, an outer layer may be removed from the plug 78 and the outer surface chemically treated in a manner well known in the art to enhance the bonding. The plug 78 and the portion 80 are of the same material and are two separate members only for the ease of fabrication.

It should be noted that the use of a plug 78 is not required for all inner members. In particular an alternate construction often used extends the plug 78 so as to encompass the entire member inside the layer 76. More specifically, the center of the member may be a unitary plug and the layer 76 is wrapped therearound.

The portion 80 extends over the backing members 60 and 59 and is securely bonded thereto. The properties of the elastomeric material employed to fabricate the plug 78 and the portion 80 are predetermined and known as a result of subjecting samples of each batch of the elastomeric material to standard tests. After curing the material of the plug 78 and the portion 80, however, the properties of the elastomer as cured may not be uniform throughout the entire cross-section. Accordingly, the outer peripheral surface of the portion 80 which is subject to high stresses, to errosive and abrasive action of the high velocity gas stream, and to gas permeation may or may not display the physical properties as indicated by the samples prepared from the batch that made up the plug 78 and the portion 80.

Consequently, in fabricating the valve member 20 the body 74 is fabricated to a selected diameter. A layer 76 of elastomeric stock of controlled properties and qualities is then applied and/or bonded to the outer circumferential surface of the body 74. In a preferred but not exclusive construction, a sheet of elastomeric stock is wrapped around the body 74, in sufficient layers to produce the desired thickness of layer 76. Many other techniques, however, can be employed to provide a controlled layer of elastomer 76. The secondary layer 76 is then vulcanized to the body 74 by simultaneous application of pressure and temperature until a homogeneous fusion of the body 74 and the layer 76 has been accomplished. Other methods of permanently joining the outer layer 76 to inner portion 74 may be used.

It should be noted that although only one secondary layer 76 has been disclosed, several layers may be added to the body 74 resulting in the valve inner element 20.

Since the valve inner element 20 and particularly the outer or secondary layer 76 is subjected to high velocity gases under high pressures, the interface 82 between the body 80 and the secondary layer 76 may be protected from these deleterious effects by a shield 84. The shield 84 is secured along the upstream stationary member 60 and the face of the valve inner element 20. In this manner, the interface 82 is protected on its upstream side from the effects of high pressure gas thereby preventing deterioration of the interface 82 and increasing the life expectancy of the valve 20.

Furthermore, ablation or deterioration of the inner element 20 as a result of gas permeation and the effects of high velocity gases under high pressure has been observed to be much less prevalent on the inner element 20 as opposed to prior art solid inner elements. More specifically, in the prior art inner elements, gas permeation and high velocity gas flow causes large pieces of the solid inner element to separate resulting in rapid deterioration. The inner element 20, however, with the outer layer 76 sheds only one or a portion of a layer at a time. This is due to the discontinuity at the interface of each layer 76. The interface 82 while limiting removal of the periphery 76 to the thickness of each layer, may also provide a barrier to permeation by gases and vapors contained in the flowing gas stream. Consequently, large uncontrolled pieces are not torn from the inner element 20 thus increasing the life of the inner element 20 and reducing the downtime for repair or replacement.

As indicated previously, the inner element 20 operates in the same manner as the typical prior art solid inner element in similar fluid flow regulators, such as those disclosed in U.S. Pat. No. 3,368,787—Sachnik et al. and U.S. Pat. No. 3,380,470—Culpepper, Jr. et al., in that upon compression of the inner element 20; the body 74 and the secondary layer 80 bulge in a radial direction at the outer circumferential surface 76 of the inner element 20 to reduce the flow area 21 through the regulator 10 thereby controlling the flow of gas or other fluid. Due to the improved qualities of the secondary layer or layers 76, however, the inner element 20 is able to withstand substantial pressures and abrasive forces from the fluids passing through the regulator 10 resulting in an increased life expectancy and utility of the inner element 20 as compared to the prior art solid inner elements.

Figure 3:
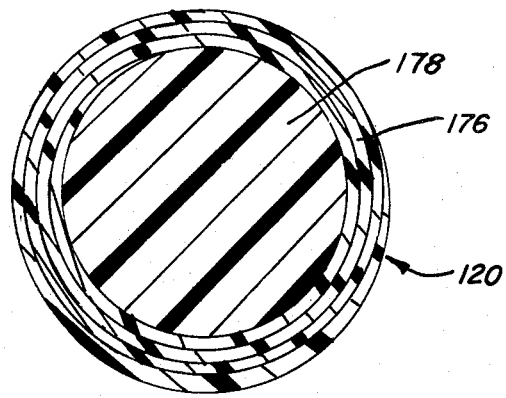
FIG. 3 is a cross-sectional view of an alternative embodiment of the valve inner element.

An alternative embodiment of the inner element 20 is illustrated in FIG. 3. The inner element 120 consists of an inner elongated plug 178 with a spirally wrapped layer 176. defining several thicknesses. The plug 178 is illustrated as solid but may be hollow in a manner similar to the plug illustrated in U.S. Pat. No. 2,917,269. The spiral cross-section of the element 120 has been found to be less subject to deleterious ablation during use.

Many modifications and variations of the present invention are possible in light of the above teachings. It should be understood that, within the scope of the appended claims, the invention may be practiced otherwise than as specifically described above.

What is claimed and desired to be secured by Letters Patent of the United States is:

1. A fluid flow regulator comprising:
   a housing having a fluid inlet and a fluid outlet and a cavity therebetween;
   a cylinder mounted for reciprocation in said cavity;
   a stationary backing member mounted within said cavity;
   means for reciprocating said cylinder;
   a valve inner member defined by a plug of elastomer material being mounted adjacent said cylinder for compression thereby so as to radially expand for regulation of said fluid flow,
   said plug including a recess on the outer periphery thereof defined by the removable of an outer layer of said plug and an annular layer being mounted in said recess and secured to said plug to define a continuous outer peripheral surface, and shield means mounted on an end of said plug extending over an end of said annular layer for protection from fluid flow.

2. A regulator as claimed in claim 1, said layer being bonded to said surface.

3. A regulator as claimed in claim 1 wherein said layer is fabricated from an elastomer material.

4. A regulator as claimed in claim 3, said elastomer material of said plug being of a different hardness than said elastomer material of said layer.

5. An inner member for use in a fluid flow regulator of the type including a housing having an axially aligned inlet and an outlet to define axial flow of said fluid therethrough, a reciprocating cylinder mounted within said housing axially disposed between said inlet and outlet, a backing member fixedly secured to said housing between said outlet and said inlet adjacent said cylinder, and means for reciprocating said cylinder, said inner member comprising:
   a plug of elastomeric material mounted between said cylinder and said backing member; a recess on the outer periphery of said plug defined by the removable of an outer layer of said plug;
   at least one secondary layer of elastomeric material being mounted in said recess to define a continuous outer surface and positioned between said piston and said backing member wherein said plug and said layer expand radially upon compression by said cylinder to control said fluid flow, and means extending over an end portion of said plug and said secondary layer for protection from said fluid flow.

6. The inner member as claimed in claim 5 wherein said elastomeric material of said plug and said layer is nitrile rubber.

7. The inner member as claimed in claim 5 said material comprising said plug being of a lower hardness than said material comprising said secondary layer.

8. The inner member as claimed in claim 5 said material comprising said secondary layer having more uniform physical properties than said material comprising said plug.

9. The inner member as claimed in claim 5 wherein said secondary layer is spirally disposed around said plug periphery.

10. An inner member for use in a flow regulator to control fluid flow through said regulator by radial expansion comprising:
    a body;
    said body comprising;
    an elongated elastomeric plug; including a recess defined therein by the removable of an outer periphery layer of said plug
    an outer layer of elastomeric material spirally wrapped around said plug in said recess to define a continuous outer surface and means extending over an end portion of said plug and said elastomeric outer layer for protection from said fluid flow.

11. The inner member claimed in claim 10 wherein the elastomeric plug and outer layer material is nitrile rubber.

12. In a fluid flow regulator of the type mounted in a fluid flow line for controlling flow in said line, said regulator including a housing defining a central chamber including a coaxial fluid inlet and fluid outlet each adapted to communicate with said fluid flow line, a piston mounted for reciprocation within said chamber, means for actuating said piston, and a backing member fixedly secured within said chamber, the improvement comprising:
    an inner member comprising a plug mounted within said chamber in axial alignment with said flow and between said piston and said backing member;
    an outer peripheral layer of said body having been removed therefrom, to define a recess
    at least one secondary layer of a greater hardness and uniformity than said plug secured in said recess and aligned such that upon compression by said piston, said plug and said layer expand radially to control said fluid flow.

13. The improvement set forth in claim 12 further comprising an interface between said plug and said layer and means disposed adjacent said plug and said layer for preventing fluid flow through said regulator from making direct contact with said interface between said plug and said layer.

14. The improvement set forth in claim 12 said layer being bonded and vulcanized to said plug.

15. The improvement set forth in claim 12 wherein said plug and said layer are both of elastomeric material.

16. The improvement set forth in claim 15 said elastomeric material of said plug and said layer being nitrile rubber.

17. An inner member for use in a fluid flow regulator to control fluid flow therethrough by radial expansion comprising:
    an elastomeric elongated cylindrical plug including first and second longitudinal ends with an outer peripheral layer of said plug removed therefrom to define a recess;

at least one elastomeric layer secured to the outer periphery of said plug between said ends in said recess, said elastomeric layer being of a different hardness and uniformity than said plug and spirally disposed around said plug a shield secured to said first end extending over the interface defined between said plug and said at least one elastomeric layer;

a first backing member secured to said first end including means for securing said first backing member to said regulator with said first end upstream of said second end; and a second backing member secured to said second end and including means for securing said second backing member to said regulator.

18. The member claimed in claim 17 wherein said plug comprising elastomeric material of a lower hardness than the elastomeric material comprising said layer.

19. The member claimed in claim 17 wherein the elastomeric material comprising said plug and said layer is nitrile rubber.

20. The member claimed in claim 17 wherein said plug is hollow.

* * * * *